United States Patent [19]

Zampedro

[11] 4,169,609
[45] Oct. 2, 1979

[54] BICYCLE WHEEL DRIVE

[76] Inventor: George P. Zampedro, 1034 Mercer St., N.E., Warren, Ohio 44483

[21] Appl. No.: 872,725

[22] Filed: Jan. 26, 1978

[51] Int. Cl.² .............................................. B62M 1/04
[52] U.S. Cl. .................................... 280/241; 280/252
[58] Field of Search ...................... 280/241, 252, 251

[56] References Cited

U.S. PATENT DOCUMENTS

| 556,802 | 3/1896 | Boyle | 280/241 |
|---|---|---|---|
| 566,838 | 9/1896 | Boyle | 280/241 |
| 661,630 | 11/1900 | Allen | 280/252 |
| 3,891,235 | 6/1975 | Shelly | 280/252 |

FOREIGN PATENT DOCUMENTS 3288 of 1911 United Kingdom ..................... 280/252

*Primary Examiner*—Joseph F. Peters, Jr.
*Assistant Examiner*—Terrance L. Siemens

*Attorney, Agent, or Firm*—Webster B. Harpman

[57] ABSTRACT

A bicycle wheel drive has a pair of pedals arranged for reciprocal motion at a slight angle from vertical beneath and forwardly of the seat of a bicycle. Sprockets on the bicycle at the opposite ends of the paths of the reciprocable pedals receive bicycle chains, at least one of which is also engaged on a sprocket on a wheel of the bicycle to be driven. Carriages movable in the reciprocable path of the pedals mount the pedals and one-way ratchets incorporating sprockets mounted on the carriages engage the bicycle chains so that alternate up and down movement of the pedals by a bicycle rider imparts a continuous rotary motion to the sprocket on the driven wheel of the bicycle. A flexible cable interconnects the carriages carrying the pedals and is trained over an idler pulley near the upper end of the reciprocal path of the pedals so that downward motion of one of the pedals imparts upward motion to the other pedal.

6 Claims, 6 Drawing Figures

4,169,609

BICYCLE WHEEL DRIVE

BACKGROUND OF THE INVENTION (1) Field of the Invention

This invention relates to bicycle wheel drives for conveying motion from pedals to a driven wheel of the bicycle.

(2) Description of the Prior Art

Prior wheel drive mechanisms have generally comprised a large rotatable sprocket on a bicycle and a pair of pedals secured thereto with a chain connecting the pedal carrying sprocket to a driven sprocket on a wheel of the bicycle. Rotation of the pedals by the bicycle rider causes the riders feet engaging the pedals to follow a circular path. The pedals are oppositely disposed so that once in each revolution the pedals are positioned vertically with respect to one another and must be moved from that vertical dead center position to enable force imparted the pedals to be delivered as rotary motion to the driven wheel of the bicycle. Proposals for reciprocal motion of bicycle driving pedals have been made and U.S. Pat. No. 3,891,235 discloses one such proposal wherein pedals attached to a pair of chains, both of which are trained over ratchets incorporating sprockets on the driven bicycle wheel are movable in a vertical reciprocal motion and wherein the motion of the pair of chains reverses with each alternate movement of the pedals attached thereto.

The present invention discloses a substantial improvement over the device of U.S. Pat. No. 3,891,235 for the reason that the chains move continuously in one direction while the pedals and the carriages on which they are mounted reciprocate with ratchet incorporated sprockets on the carriages conveying full downward thrust of the pedals to the chains at all times.

SUMMARY OF THE INVENTION

A bicycle wheel drive mounts a pair of carriages for substantially vertical travel in a reciprocal fashion beneath the seat of the bicycle and angling forwardly therefrom. Pedals on each of the carriages are conveniently engaged by the bicycle rider. A pair of horizontally spaced sprockets are mounted beneath the bicycle seat at the upper end of the path traveled by the reciprocal pedals and carriages and a pair of sprockets are mounted on the bicycle at the lower end of said path. A first chain is trained over one of each of the upper and lower sprockets on the bicycle and over a sprocket affixed to the driven wheel of the bicycle. A second chain is trained over the other one of each of the upper and lower sprockets and each of the carriages has a one-way ratchet controlled sprocket mounted thereon continuously engaging one of said chains whereby alternate substantially vertical motion of the pedals and carriages imparts continuous downward thrust to said chains which is transmitted to said driven wheel.

DESCRIPTION OF THE PREFERRED EMBODIMENT

Figure 1:
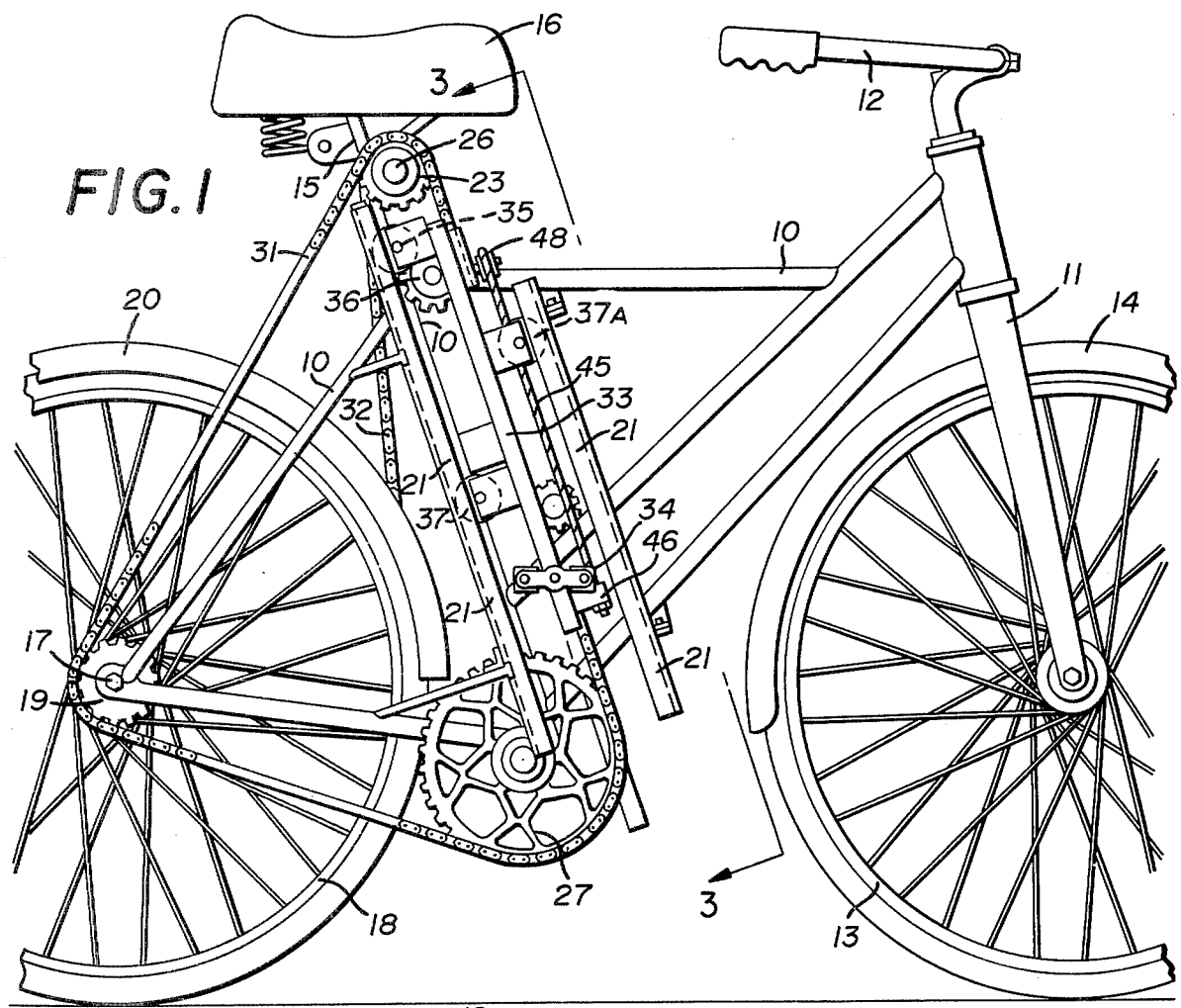
FIG. 1 is a side elevation of a bicycle with parts broken away showing the bicycle wheel drive.
Figure 2:
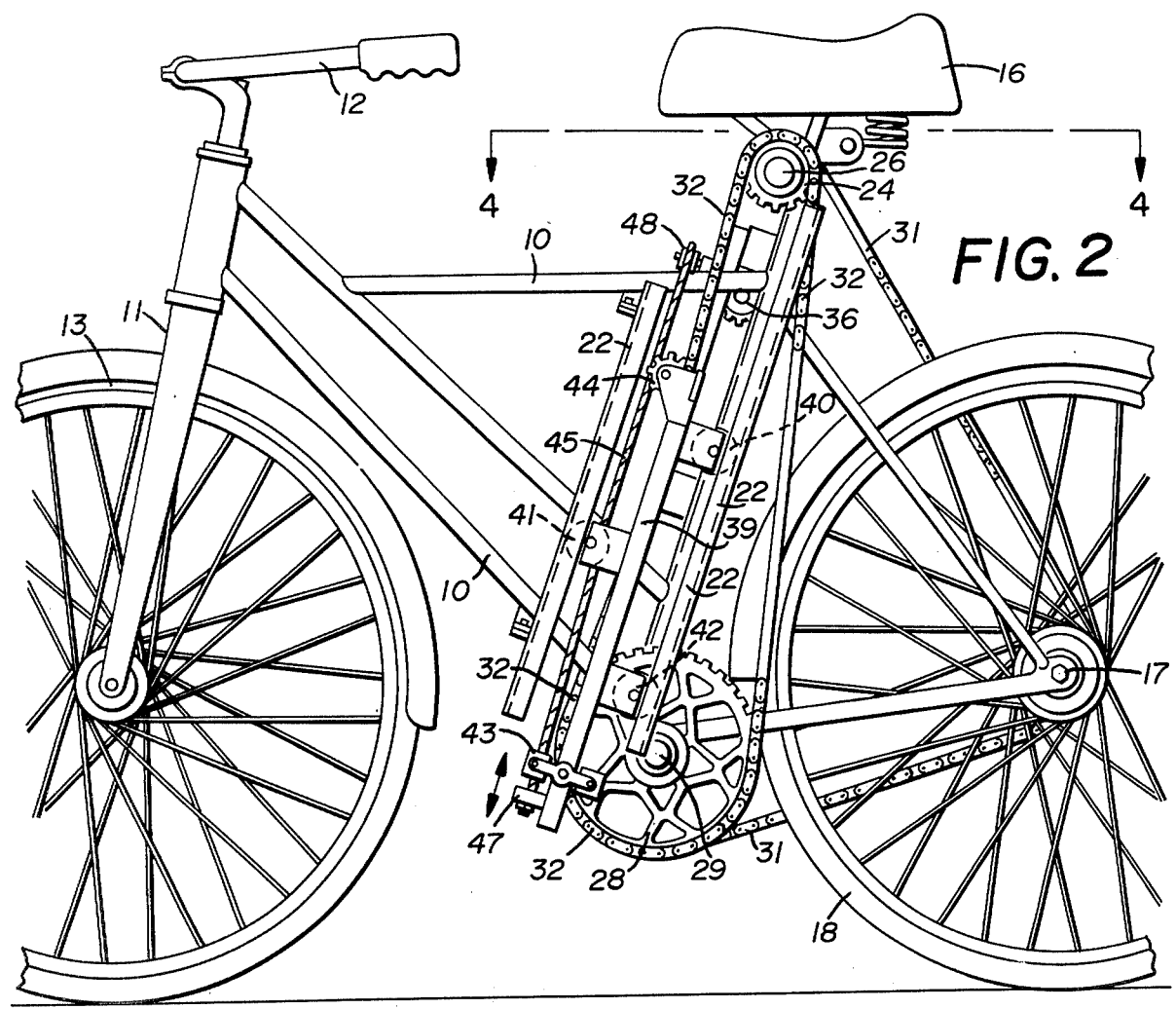
FIG. 2 is an opposite side elevation of a bicycle with parts broken away showing the bicycle wheel drive.

By referring to the drawings and FIGS. 1 and 2 in particular, it will be seen that a bicycle is disclosed and that it incorporates a frame 10 having a journaled fork 11 at its front end, the right end in FIG. 1, and handle bars 12 thereon. A front wheel 13 is rotatably positioned in the fork 11 and a fender 14 is carried by the fork 11 in customary spaced relation to the wheel 13. The rear middle portion of the frame 10 has an upward extension 15 mounting a seat 16 and the rearmost portion of the frame 10 journals an axle 17 on which a rear driven wheel is rotatably positioned. A sprocket 19 is affixed the axle of the rear driven wheel 18. A fender 20 is secured to the frame 10 in customary relation to the wheel 18. Two pair of horizontally spaced tracks 21 and 22 are positioned at an angle from vertical beneath the seat 16 and on the opposite sides of the frame 10 and secured to portions thereof. A horizontally spaced pair of sprockets 23 and 24 are mounted on a shaft 25 which is journaled and attached to the frame 10 beneath the seat 16 by a journal 26. Sprockets 27 and 28 are mounted on a shaft 29 which is rotatably journaled and attached to a lower portion of the frame 10 by a journal 30. A first bicycle chain 31 is trained over the sprocket 19 on the wheel 28 and over the sprocket 23 on the shaft 25 and over the sprocket 27 so that a section of the bicycle chain 31 runs between and parallel with the horizontally spaced tracks 21 on one side of the frame 10. A second bicycle chain 32 is engaged over the sprocket 24 and the sprocket 28 so that a section thereof runs between and parallel with the horizontally spaced tracks 22.

Figure 3:
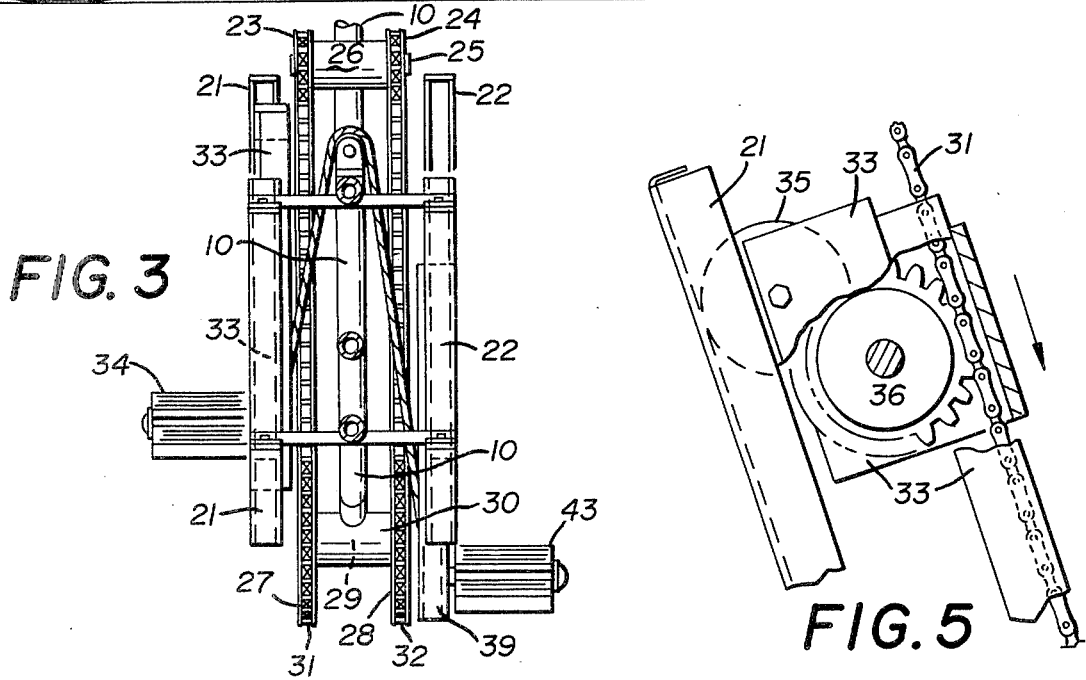
FIG. 3 is a section on line 3—3 of FIG. 1.
Figure 5:
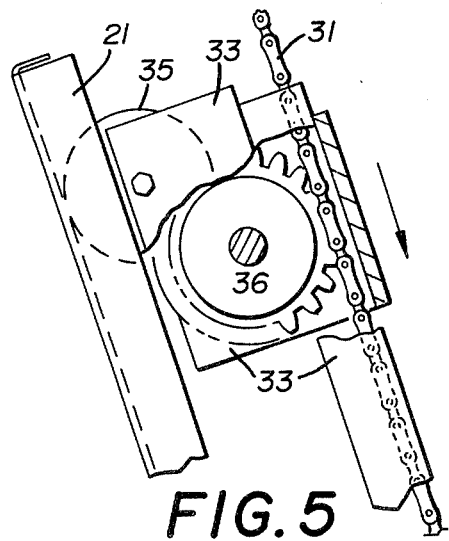
FIG. 5 is an enlarged detail of a portion of one of the carriages and the one-way ratchet controlled sprocket thereon.

By referring now to FIGS. 1 and 3 of the drawings, it will be seen that a first carriage 33 comprises an elongated member carrying a pedal 34 which is rotatably affixed thereto near the lower end thereof. Three oppositely disposed longitudinally spaced wheels 35, 37 and 37A on the carriage 33 mount the same between the pair of horizontally spaced tracks 21 for reciprocal motion longitudinally thereof. A one-way ratchet incorporating sprocket 36 is mounted on the carriage 33 (see FIG. 5). so that reciprocal motion of the carriage 33 will cause the sprocket 36 to engage a section of the bicycle chain 31 and move it downwardly as seen in FIGS. 1, 3 and 5 of the drawings each time the carriage 33 moves downwardly and alternately cause the idling rotation of the ratchet controlled sprocket 36 relative to the carriage 33 when the carriage 33 moves upwardly.

In FIG. 1 of the drawings, the pedal 34 on the carriage 33 is shown in substantially uppermost position.

It will be observed that the downward movement imparted the first bicycle chain 31 is directly conveyed thereby to the sprocket 19 and the rear driven wheel 18 of the bicycle.

By referring now to FIG. 2 of the drawings, it will be seen that the other side of the bicycle with respect to FIG. 1, carries the pair of horizontally spaced tracks 22 with a section of the second bicycle chain 32 being positioned therebetween and parallel therewith. The second bicycle chain 32 is trained over the sprocket 24 beneath the seat 16 of the bicycle and over the sprocket 28 at the lower portion of the frame 10 of the bicycle.

A second carriage 39 is provided with three oppositely disposed wheels 40, 41 and 42 which are engaged in the oppositely disposed horizontally spaced tracks 22 and the second carriage 39 has a pedal 43 pivotally mounted thereon adjacent its lower end. A second one-way ratchet controlled sprocket 44 is positioned on the upper end of the second carriage 39 and engaged in the section of the second bicycle chain 32 which runs between and in parallel relation to the horizontally spaced tracks 22. The location of the second ratchet controlled sprocket 44 relative to the second carriage 39 is slightly different from the comparable location of the ratchet 36 on the first carriage 33, but the operation is exactly the same, namely; downward movement of the second carriage 39 as caused by downward motion imparted the pedal 43 will lock the ratchet controlled sprocket 44 relative to the carriage 39 and thereby impart the same downward movement to the second bicycle chain 32.

The shafts 26 and 29 on which the sprockets 24 and 28 are mounted, will convey the rotary motion to the sprockets 23 and 27 and thereby to the first bicycle chain 31 which extends to and engages the sprocket 19 on the rear driven wheel 18 of the bicycle. In order that the carriages 33 and 39 will reciprocate upwardly and downwardly alternately, a flexible cable 45 is attached at its ends to brackets 46 and 47 on the carriages 33 and 39 and trained over a pulley 48 on an upper portion of the bicycle frame 10.

Figure 4:
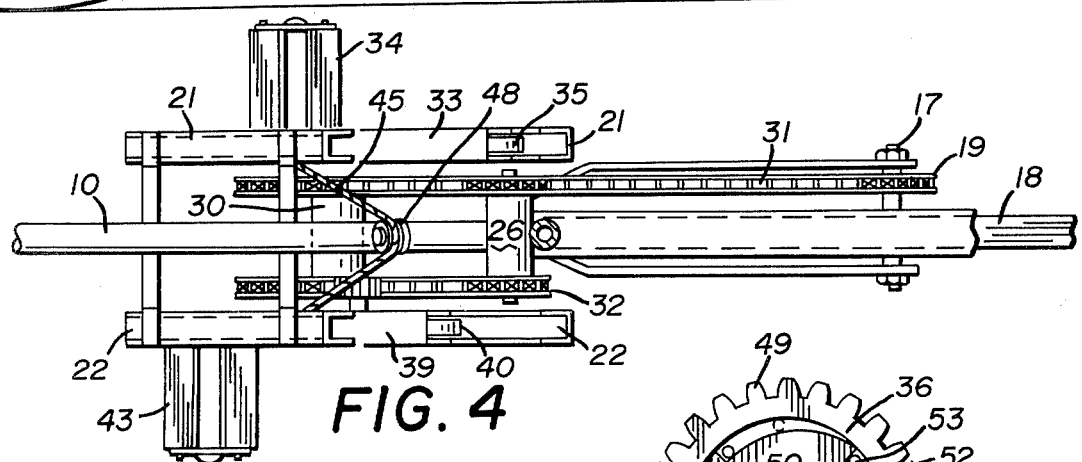
FIG. 4 is a horizontal section on line 4—4 of FIG. 2.

By referring now to FIG. 4 of the drawings, the flexible cable 45 and its engagement over the pulley 48 on the upper portion of the frame 10 of the bicycle may be more clearly seen and it will be observed that downward movement of the pedal 34 on one side of the bicycle frame 10 will move the cable 45 and the end thereof attached to the carriage 33 downwardly, thus causing the opposite end of the cable 45, which is attached to the carriage 39, to move upwardly and thereby elevate the pedal 43.

Figure 6:
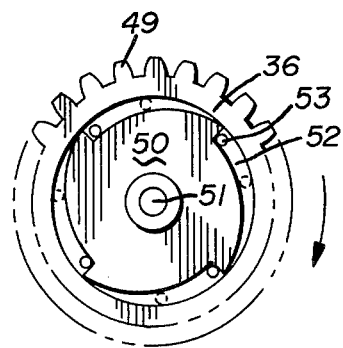
FIG. 6 is a cross sectional view of the ratchet controlled sprocket of FIG. 5.

By referring to FIG. 6 of the drawings, a vertical section through the one-way ratchet controlled sprocket 36 may be seen and it will be observed that the sprocket 36 has its exterior circumferentially arranged gear teeth 49 in a ring configuration rotatably positioned about a hub portion 50 which is secured to a mounting bracket 51 which in turn is carried by the carriage 33 as heretofore described. The periphery of the hub 50 has a series of cams 52 formed therein and a plurality of rollers 53 are positioned between the cams 52 and the inner annular surface of the sprocket 36 so that the sprocket 36 can revolve counter clockwise freely but upon being revolved clockwise as shown in the arrow in FIG. 6, will lock to the hub 50 through the wedging action of the rollers 53 as will be readily understood by those skilled in the art.

It will thus be seen that a bicycle wheel drive has been disclosed which provides for considerably more forceful application of the energy expended by a rider alternately pushing the pedals 34 and 43 downwardly as there is no dead center position and all of the force exerted by the rider is directly transmitted to the bicycle chains 31 and 32 and by them directly to the driven wheel of the bicycle.

Tests with prototypes of the invention clearly indicate the advantages of the reciprocal application of driving force which this invention provides and demonstrates that the bicycle is moved forwardly with less energy than is necessary when a conventional rotary sprocket and pedal and arm assembly is used.

Although but one embodiment of the present invention has been illustrated and described, it will be apparent to those skilled in the art that various changes and modifications may be made therein without departing from the spirit of the invention and having thus described my invention what I claim is:

1. A wheel drive for a bicycle having a frame rotatably supporting the axles of front and rear bicycle wheels including dual track means secured to the opposite sides of said frame and arranged at an angle from vertical, a carriage arranged for longitudinal movement in each of said track means and a pedal on each of said carriages in oppositely disposed outwardly extending relation, a pair of sprockets journaled on said frame above said track means and a second pair of sprockets journaled on said frame adjacent the lower ends of said track means, a rear wheel sprocket on said rear wheel and a first bicycle chain trained over said rear wheel sprocket over one of said sprockets on the upper portion of said frame and over one of said sprockets adjacent the lower ends of said track means with a section of said first bicycle chain being positioned in parallel relation to one of said track means, a one-way ratchet having a sprocket configuration mounted on one of said carriages, said sprocket engaged in said parallel section of said first bicycle chain, said ratchet and sprocket arranged to lock to said carriage when rotated in one direction and to rotate freely when rotated in the opposite direction, a second bicycle chain trained over the other one of said sprockets on the upper portion of said frame and over the other one of said sprockets adjacent the lower ends of said track means, a section of said second bicycle chain being positioned in parallel relation to a second carriage in the other one of said track means on the other side of said frame and a second one-way ratchet and sprocket on said second carriage with said sprocket engaging said second bicycle chain, whereby alternate reciprocal motion imparted said pedals will move said first and second bicycle chains so as to rotate said rear wheel sprocket and the rear wheel.

2. The wheel drive for a bicycle set forth in claim 1 and wherein each of said pairs of sprockets are joined to a common rotatable shaft so that motion imparted to one of said sprockets of each pair is transferred to the other sprocket of said pair.

3. The wheel drive for a bicycle set forth in claim 1 and wherein a pulley is positioned on said frame above said track means and a flexible connecting member is secured at its ends to each of said carriages and trained over said pulley.

4. The wheel drive for a bicycle set forth in claim 2 and wherein said track means comprises two spaced parallel longitudinally extending members.

5. The wheel drive for a bicycle set forth in claim 4 and wherein each of said carriages has wheels engaging said spaced parallel longitudinally extending members.

6. The wheel drive for a bicycle set forth in claim 1 and wherein said parallel sections of said first and second bicycle chains are positioned for registry with said sprockets of said ratchets and portions of said carriages form guides on the opposite sides of said chains with respect to said ratchets so as to prevent deflection of said chains with respect to said sprockets.

* * * * *